Jan. 12, 1971 L. E. SHAW ET AL 3,554,999

METHOD OF MAKING A SHRINK DEVICE

Filed July 14, 1966 2 Sheets-Sheet 1

INVENTORS
LESLIE E. SHAW
PETER M. MACLEAN
BY Teare, Teare & Sammon
ATTORNEYS

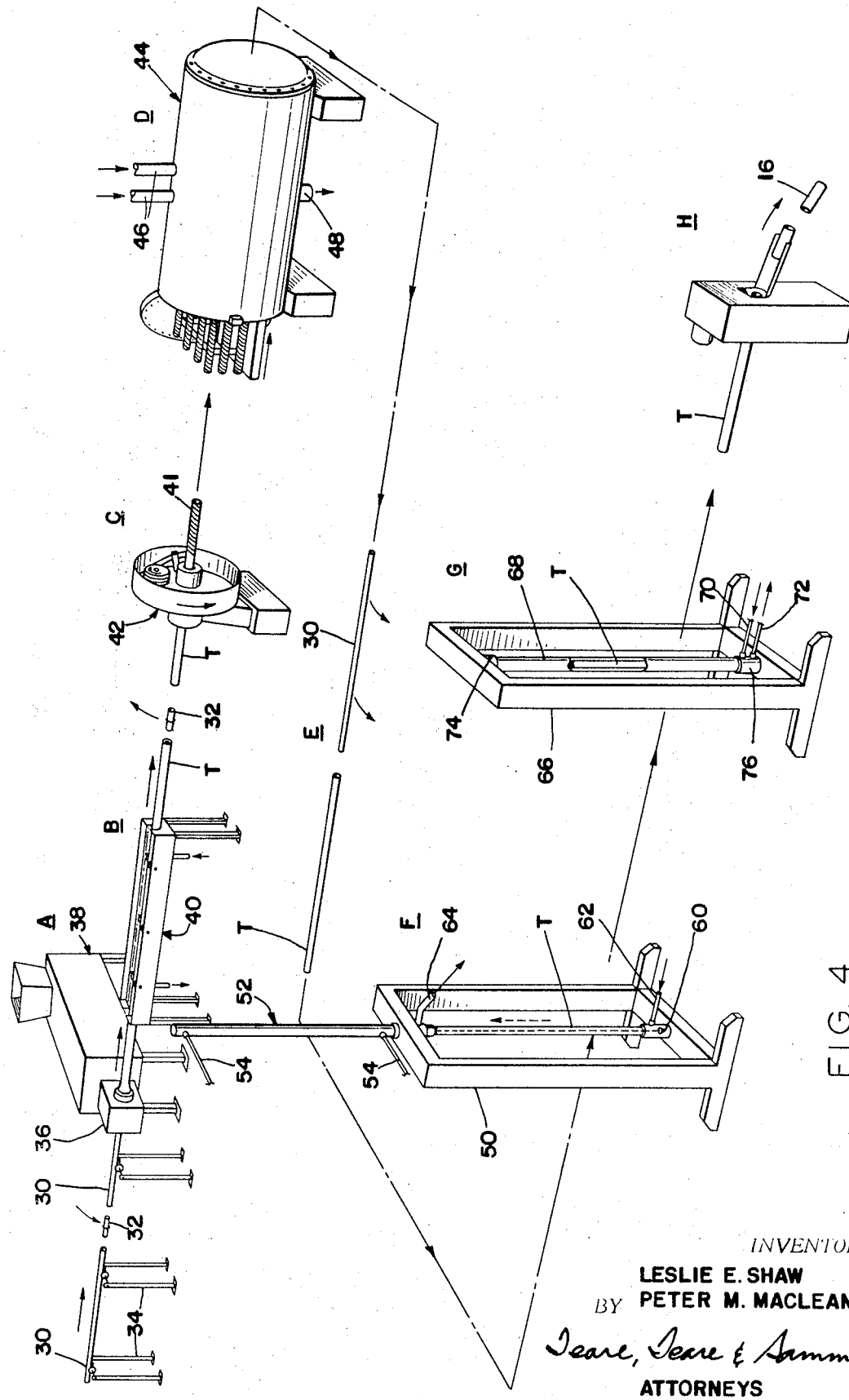

United States Patent Office 3,554,999
Patented Jan. 12, 1971

3,554,999
METHOD OF MAKING A SHRINK DEVICE
Leslie E. Shaw, Islington, Ontario, and Peter M. Maclean, Willowdale, Ontario, Canada, assignors to Shaw Pipe Protection Ltd., Toronto, Ontario, Canada
Filed July 14, 1966, Ser. No. 565,139
Int. Cl. B29g 2/00; B29c 17/04
U.S. Cl. 264—95                11 Claims

ABSTRACT OF THE DISCLOSURE

A method for making a heat shrinkable tubing from an extruded cross-linkable polymeric material including the steps of curing the tubing at a temperature above its crystalline melting point to give cross-linking of the material sufficient to provide a predetermined elastic memory in the finished tubing, applying a uniform adhesive coating to the interior surface of the tubing, and expanding the coated tubing at a temperature above its crystalline melting point while maintaining the uniformity characteristics of the coating to set the tubing with a predetermined shrink-back from its fully expanded dimension.

---

This invention relates to coating of pipe lines or the like, and more particularly to an improved method of making a heat shrinkable sleeve device for use in the laying of pipe lines and the like.

In the installation of pipe lines, it has been the practice to join a series of coated pipe sections together to form "joints," such as by welding, to form a continuous pipe line. The pipe sections are prepared for welding at the place of coating or at the work site by cutting the coating back, such as by about 2 to 6 inches, from the adjacent pipe section ends leaving the pipe base for welding. This uncoated area of pipe must then be protected in some manner to prevent corrosion, such as by the migration of moisture, or entry of dirt which may result after installation of the pipe line in a trench for fluid transmission beneath the ground.

Heretofore, various methods have been employed to protect the pipe joint. One such method has been to wrap the joint with a specially treated fabric or tape or to pour a molten coating onto the joint or both. Such fabrics or tapes tend to loosen and/or wear out which results in non-unformities and air entrapment beneath the wrapping which allows seepage of moisture into the joint. The poured coatings fail to provide an adequate bond and have a tendency to crack after extended usage. In addition, such methods are difficult and time consuming to achieve, particularly at the work site.

Another more recent method has been to protect the joint with a heat shrinkable sleeve comprised of polymeric material having elastic memory characteristics. The sleeve has usually incorporated a layer of adhesive material, so that when slipped over the joint and heated, the sleeve is shrunk down around the pipe with the adhesive being forced around the joint and uncoated area. It has been known to make such shrink sleeves from a cross-linked composition, such as of high density polyethylene, achieved by an irradiation process. A number of difficulties, however, have been encountered in the use of such sleeves which result generally from their nonuniformity of behavior during the shrink down. It has been found that such sleeves shrink substantially simultaneously in both radial and axial directions upon application of heat thereto. It is known that this dual contraction results from the presence of radial and axial expansion of the material during processing due to the presence of pulling forces on the material in its "soft state." Such contraction sets up opposing force components which dissipate the radial pull down forces so as to cause a nonuniform and appreciably slow shrink down. A further correlative difficulty resides in the fact that heretofore known process for making such high density material produces a structure having an inherent high order of stiffness. In such structure, the internal forces of processing are not uniformly distributed which results in distortion thereof during the shrink down.

After shrink down of such heretofore known sleeves, the applied adhesive layer has been observed to exhibit a significant frequency of irregularly thicker and thinner sections at varying intervals along the sleeve as viewed in longitudinal cross-section. Such irregularity in the cross-sectional thickness of the adhesive layer has been found to relate to the formation of elongated blisters, on the recovered sleeve—indicating nonuniform and incomplete sleeve recovery. This incomplete sleeve recovery results in entrapping fluid, such as moisture and the like, as well as other corrosive conditions between the sleeve and the pipe. This condition presents a considerable problem, where such a blister extends to an end edge of the sleeve which results in capillary ingress of fluid (and hence corrosion) from the environment in which the sleeve is to be employed.

In addition, such nonuniformity of behavior during the shrink down produces "wrinkles" and "puckers" in the sleeve material which results in air entrapment between the sleeve and uncoated area of the joint and which may actually cause "splits" or "cracks" in the material requiring repair and/or replacement of the sleeve. Furthermore, such sleeves are not only costly to produce, but require considerable amounts of time and expensive auxiliary heating equipment in order to achieve a complete recovery of the material in the installed position with a pipe or the like.

Accordingly, the present invention contemplates the provision of an improved method of making a cross-linked polymeric shrink sleeve which overcomes the aforementioned and other related disadvantages of heretofore known shrink sleeve devices that generally provides an improved uniformity of behavior; which incorporates increased, uniform radial "pulldown" force characteristics; which greatly reduces the time heretofore required for sleeve recovery; which eliminates the need for intricate and costly heating equipment to achieve the shrink down; which may be quickly and easily installed around a pipe or the like without the formation of blisters, wrinkles, puckers and other distortions in the recovered condition thereof; which may incorporate an adhesive layer having a uniform thickness in longitudinal cross section throughout its length, except adjacent the sleeve end portions; which includes sleeve end portions "turned-down" into engagement with the pipe or the like to prevent capillary ingress of fluid, such as moisture or the like, adjacent the sleeve ends; and which provides a more effective seal between the sleeve and the pipe joint, particularly adjacent the sleeve ends.

Other objects and advantages of the invention will become apparent from the following description in conjunction with the accompanying drawings, wherein.

Figure 1:
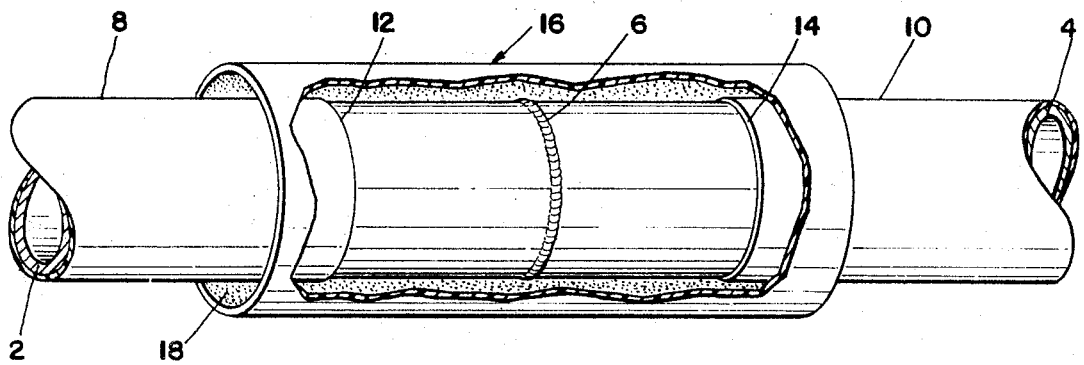
FIG. 1 is a fragmentary generally perspective view and partially cutaway showing two coated pipe sections joined together and with the shrink sleeve device made in accordance with the invention in position for sealing the joint.
Figure 2:
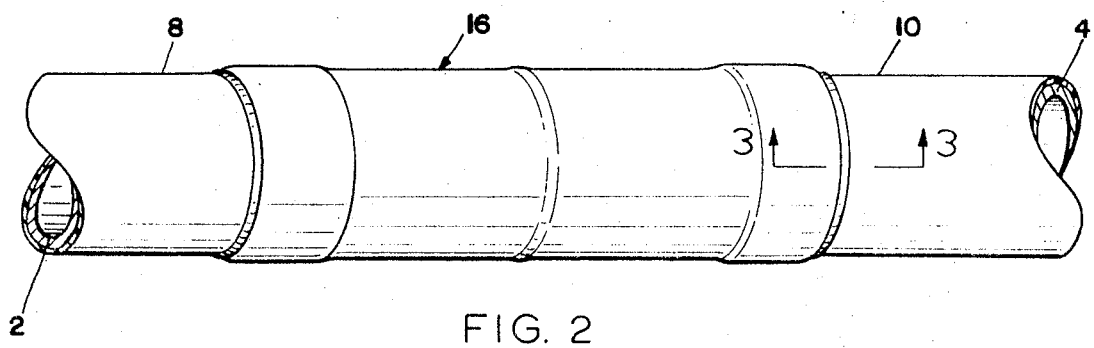
FIG. 2 is a fragmentary generally perspective view of the coated pipe sections of FIG. 1 and showing the shrink sleeve device after it has been shrunk into the installed position.
Figure 3:
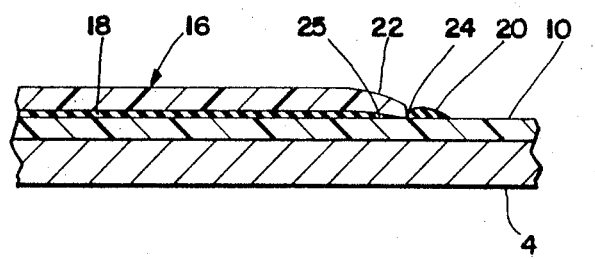

FIG. 3 is an enlarged cross section view taken along the line 3—3 of FIG. 2, and showing in greater detail the radial turned-down construction at one end of the shrink sleeve made in accordance with the invention; and FIG. 4 is a generally schematic illustration showing an apparatus system which may be employed to make the shrink sleeve of FIGS. 1 to 3 in accordance with the method of the invention.

Referring again to the drawings and in particular to FIGS. 1 and 2 thereof, there is illustrated two pipe sections 2 and 4 disposed in end-to-end relationship and joined together adjacent their abutting ends, as at 6, such as by a weldment. As shown, each pipe section 4 and 6 may be covered with a protective exterior coating 8 and 10 which may be spaced axially or cut back a predetermined amount, such as 2 to 6 inches, from the pipe ends so as to leave the coating on each pipe section with a square-butt end, as at 12 and 14. One satisfactory composition for the coating may be an extruded high density thermoplastic material which may have a thickness of about 25 mils to 60 mils.

As an initial step in installing a sleeve, and before the pipe sections 2 and 4 are joined together, the sleeve 16 may be disposed in loosely fitted relationship over one end of one of the respective pipe sections, as shown in FIG. 1. Such process may be repeated as the pipe line is progressively constructed so as to cover the exposed pipe areas adjacent each weld joint. The sleeve 16 is preferably coated on its interior surface with an adhesive layer 18 which does not become rigid, but remains generally flexible at a temperature, such as between about −40° F. to 180° F., to provide an effective seal between the bare portions of the joint, the pipe coatings 8 and 10, and the sleeve 16. The adhesive may be an elastic resinous material, such as Lotol 6114, which may be obtained commercially from the Dominion (UniRoyal) Rubber Company.

Installation of the sleeve 16, may be achieved by positioning the same so as to slightly overlap the coatings 8 and 10 a few inches at each end and then heating the same, such as by a hot air heater, to a temperature above its crystalline melting point, such as 200° F. or above. This quickly and uniformly shrinks the sleeve 16 tightly around the pipe sections 2 and 4, as aforesaid.

Upon application of heat, the sleeve 16 is drawn uniformly and circumferentially around the pipe sections 2 and 4 with no axial contraction so that the pressure exerted by the sleeve material causes the material of the adhesive layer 18 to exude axially outwardly into opposite directions toward the sleeve ends, as at 20 of FIG. 3. By this radial pressure, the marginal end edge portions of the sleeve 16 are pulled or turned downwardly and inwardly through the adhesive layer 18 as by a necking action, such as at 22, and preferably into intimate surface-to-surface contact, as at 24, with the confronting surface of the pipe coatings 8 and 10. Moreover, the sleeve end edge portions 22 are progressively curved downwardly and inwardly so as to have a generally meniscus (converging concavo-convex) profile in longitudinal cross section. The exuded adhesive material 20 provides, in effect, an extension of the upper surface of the end edge portions 22 and assumes a generally plano-convex profile in longitudinal cross section.

As seen in FIG. 3, the adhesive layer 18 preferably has a longitudinally uniform thickness, such as for instance 20 mils, throughout the entire length of the sleeve 16, except for progressively thinned down portions 25 which may, when properly applied, extend inwardly a length, such as about ¼ inch, from each end of the sleeve. These thinned down portions 25 assume a semiaxially plano-convex profile in longitudinal cross section due to the radial pressure imparted by the sleeve end edge portions 22 against the supporting surface—in this case the pipe coatings 8 and 10. Thus virtually no material of the adhesive layer 18 remains at the terminal area 24 which together with the extruded portions 20 indicates a complete sleeve recovery to provide an effective sealing action around the weld joint. By this arrangement, the progressively reduced thickness of the adhesive layer, as at 25, provides a substantial reduction in degradation of the adhesive adjacent the sleeve ends. This preferred longitudinal profile, and hence the sealing action, is maintained with great regularity around the entire circumference of the recovered sleeve in the assembled position thereof.

In accordance with the invention, the sleeve 16 is preferably made from a polymeric material selected from a group of cross-linkable materials which sustain cross-linking reactions in a manner so that no subsequently induced physical state is affected by physical state irregularities (e.g., extrusion or molding stress, density or thermal patterns or crystallinity variations due to coating methods) which may exist prior to such cross-linking. Examples of specific materials which are satisfactory are set forth in the Canadian Pat. No. 647,433, filed July 24, 1956.

Generally, Canadian Pat. No. 647,433 sets forth compositions comprising an admixture of polyethylene and a peroxide of the following formula: R—O—O—R′ where R and R′ are each hydrocarbon radicals containing a tertiary carbon atom attached to each oxygen atom of the peroxide linkage and at least one of the R's contains at least one aromatic group.

One such material which is satisfactory is low density polyethylene which is commercially available as H.F.D. 4201 and 4208 from Union Carbide. The polyethylene material may be modified for color, such as by the addition of yellow, black and the like pigments, as are known in the art. The cross-linking of such materials during curing converts the polyethylene into a thermoset material which incorporates particularly good physical characteristics, such as dimensional stability, toughness at elevated temperatures and the elimination of environmental stress-cracking failure.

In FIG. 4 there is shown an apparatus system for carrying out the process of the invention as applied to the treatment of cross-linkable polymeric materials of the character described to produce the heat shrinkable sleeve 16 of FIGS. 1 to 3. As shown, a series of hollow mandrels 30 may be detachably joined together by couplings 32 and may be delivered via a succession of roll frames 34 to an extrusion station A. At station A, the material may be extruded around the respective mandrels 30 from a crosshead 36 of an extruder 38. Preferably, the material is extruded at a temperature between about 240° F. to 260° F. dependent upon the diameter and wall thickness of the finished sleeve. The tubing T must be extruded to a diameter less than the pipe diameter to which it is to be applied.

The mandrel 30 supporting the extruded tubing T is then moved to a cooling station B where the tubing is cooled to ambient temperature, such as by water or the like, circulated through a tank 40. After cooling, a respective coupling 32 may then be detached, the tubing cut adjacent the joint, and the mandrel 30 and tubing T moved to a wrapping station C. It is to be noted, however, that the mandrels 30 can remain connected together by the couplings until after the wrapping operation, as desired.

At the wrapping station C, it is preferred that a thin, polymeric tape 41, such as H-film, Mylar (Du Pont's trademark for a film of polyethylene terephthalate), or the like, be wound helically in overlapped relation around the extruded tubing T, such as by means of a drum applicator 42. Such arrangement provides an adequate support throughout the axial length of the tubing T so as to withstand the heat and pressure during the subsequent cross-linking operation. However, where cross-linking and cooling are carried out in a suitable inert gas, such as steam or nitrogen, the wrapping operation may be eliminated, as desired.

After a series of tubes T have been wrapped and uncoupled, they may then be moved to a curing station D which may comprise a steam chamber 44 having inlet 46 and outlet 48 conducts for delivery and discharge of fluid. Preferably, the curing is carried out at a temperature above the crystalline melting point of the material, such as between about 325° F. to 350° F., at a pressure of about 100 p.s.i. and for a period of time between about 5 min. to 35 min. dependent upon the desired cross-linking of the molecules to provide at least some degree of elastic memory in the finished sleeve. Optionally, but technically less favorably, curing may be effected in continuity, such as by a vertical extrusion operation, by passing the tubing through a heater zone in the presence of an inert gas, such as nitrogen, at about 900° F. for approximately 30 seconds and then quench cooling before cutting the tubing into the desired lengths. By this means, the aforementioned wrapping and pressure curing steps may be omitted, as desired.

The cross-linking may be between about 30% to 90% with preferred optimum physical properties achieved at between about 60% to 80%. However, cross-linkage between about 80% to 90% has also produced satisfactory results. Such cross-linking also determines the chemical and/or physical properties of the finished sleeve, including its "pull-down" force, as will hereinafter be more fully described.

After curing, the cross-linked tubing T may then be moved to a stripping station E where the supporting material 41, such as the tape, is stripped-off and the mandrel 30 removed therefrom by suitable stripping apparatus (not shown). The tubing may then be moved to an adhesive applicator station F.

The adhesive station F may comprise a frame 50 which mounts a fluid actuated device 52 which includes a plunger (not shown) and inlet 54 and outlet 56 conduits for reciprocating the plunger. The tubing T is clamped at both ends, as at 58 and 60, so as to be in registration for receiving the plunger therein. The adhesive material is fed into an inlet pipe 62 and drawn upwardly through the tubing T so as to uniformly coat the interior surface thereof. Excess adhesive material may be drawn-off through outlet pipe 64. Preferably, the adhesive material is applied in a hot condition, such as at a temperature of between about 250° F. to 300° F. The adhesive material as applied has a minimum wall thickness of about 3 to 5 mils and a maximum wall thickness of about 25 to 30 mils. Preferably the wall thickness is about 20 mils. It is to be noted, however, that the adhesive material may also be applied to the pipes and/or joints themselves rather than to the sleeve to achieve satisfactory results, as desired.

The adhesive coated tubing T may then be moved to an expansion station G which may include a similar frame 66 which mounts a vertically disposed hollow casing 68, having an inlet 70 and outlet 72 conduit for admission of fluid under pressure to the casing 68. In operation, the tubing is clamped at both ends, as at 74 and 76, and heated fluid, such as water, is introduced under pressure via conduit 70 so as to progressively expand the tubing radially outwardly into engagement against the confronting interior surface of the casing 68. The expansion is caused by the pressure differential between the inside and the outside of the tubing. The temperature of the fluid may be from about 32° F. up to about, but below the crystalline melting point, such as 180° F., of the material. Preferably, the temperature is between about 150° F. to 175° F. to provide optimum expansion of the tubing. The fluid may be introduced under a pressure of about 20 p.s.i. to 300 p.s.i. The preferred pressure is about 25 p.s.i. to 60 p.s.i. After expansion, the tubing is cooled, if necessary, to ambient temperature, such as by introducing a coolant through the casing 68 and draining off the heated fluid via conduits 70 and 72 The expanded tubing has approximately 8% to 12% "spring-back" radially from the fully expanded diameter. The degree of expansion is controlled by the inside diameter of the casing 68 and the 8% to 12% elastic memory of the cooled expanded sleeve. The degree of expansion may be equal to the unexpanded tubing diameter plus about 5% to 420%. The preferred expansion is equal to the expanded tubing diameter plus about 20% to 120%. After expansion, the tubing T may then be moved to a cutting station H where it may be severed into the desired sleeve lengths, as desired.

As finished, the cross-linked and expanded sleeve 16 is in a "set" condition ready for application simply by applying heat thereto in a manner, as aforesaid. In this condition, it has been found that the sleeve has a radial "pull-down" force of about 40 p.s.i. to 120 p.s.i. or 3.0% to 5.4% of the rated material tensile strength. The preferred "pull-down" force has been found to be about 80 p.s.i. to 100 p.s.i. or about 3.6% to 4.6% of the rated material tensile strength, to achieve optimum shrink seal characteristics.

The radial "pull-down" force may be measured to give effective comparative results by means of suitable strain gauge equipment to indicate the stress components exerted on the sleeve material during its shrink recovery on metal tube sections. The following specific examples further illustrate the method of the present invention as may be carried out by the apparatus system shown in FIG. 4. I is to be understood, however, that such examples merely set forth specific embodiments of the invention which is not intended to be limited thereby.

EXAMPLE I

The material used was Union Carbide H.F.D. 4201. The material was extruded by a 2½ inch extruder having a 24:1 length to diameter barrel ratio and a screw compression ratio of 3:1. A 90° cross-head die was employed with a temperature profile of 260° F. for the back of the barrel, 240° F. for the front of the barrel and 250° F. for the die. The extruded material temperature was between about 250° F. to 255° F. at the front of the die. The material was extruded onto 2-inch I.D. mandrels at a gauge thickness of 0.060 inch and at a speed of 10 ft./min. Approximately 300 feet of tubing was produced.

EXAMPLE II

The extruded tubing while on the mandrel was externally wrapped with Mylar tape and placed in a steam chamber. The material was then cured at a temperature of 325° F., at a pressure of 100 p.s.i. for a period of time of 30 min. The material was then cooled to ambient temperature. The pressure of 100 p.s.i. was maintained during the cure and subsequent cooling. The degree of cure was then measured and indicated cross-linking percentages of (a) 80% for 45 mil. wall thickness, (b) 60% for 60 mil. wall thickness, and (c) 50% for 80 mil. wall thickness tubing.

EXAMPLE III

An adhesive material was then applied to the interior surface of the extruded, cross-linked tubing which had an I.D. of 2 inches. The adhesive used was the Dominiom (UniRoyal) Rubber Company's Lotol 6114 which is an asphalt base, mineral rubber plasticized material. The adhesive was applied at a temperature of between about 250° F. to 300° F. and at a gauge thickness of approximately 0.020 inch.

EXAMPLE IV

The adhesive coated tubing was then placed in a vertical expansion pipe which had an I.D. of 3.25 inches. Hot water at a temperature of between about 130° F. to 150° F. was then introduced into the tubing until a pressure was built up to expand the tubing against the sides of the pipe. The pressure was varied between 25 p.s.i. and 60 p.s.i. The pressure was maintained until the tubing was fully expanded against the sides of the pipe. The hot water was then replaced by water of ambient temperature and the pressure was maintained. After cooling, the expanded tubing was removed from the pipe. Results from this method indicated that the tubing had approximately 8% to 12% "spring-back" radially from the fully expanded diameter and that the final expanded tubing had an I.D. of approximately 2.9 inches and a wall thickness of approximately 0.040 inch.

Specific examples of the various temperature and pressure conditions for expanding the tubing in Example IV above are further set forth in the following exemplary expansion runs.

Run 1

The tubing had an I.D. of 2 inches and a wall thickness of 0.045 inch. The expansion pipe had an I.D. of 3.25 inches. The hot water was at a temperature of 140° F. and a pressure of 25 p.s.i. The final tubing had an expanded I.D. of 2.9 inches, a wall thickness of 0.032 inch.

Run 2

The tubing had an I.D. of 2 inches and a wall thickness of 0.060 inch. The expansion pipe had an I.D. of 3.25 inches. The hot water was at a temperature of 150° F. and a pressure of 45 p.s.i. The final tubing had an expanded I.D. of 2.9 inches and a wall thickness of 0.040 inch.

Run 3

The tubing had an I.D. of 2 inches and a wall thickness of 0.060 inch. The expansion pipe had an I.D. of 3.25 inches. The hot water was at a temperature of 100° F. and a pressure of 60 p.s.i. The final tubing had an expanded I.D. of 3 inches and a wall thickness of 0.030 inch.

EXAMPLE V

Sections of the expanded tubing processed in accordance with Examples I and IV above were placed on pipes and shrunk down to determine the "pull-down" character. Pipes used included externally coated 2⅜ inches O.D. pipes with a weld in the middle and uncoated 2 inch O.D. pipe with no weld. Heat was applied by a hot air gun at a temperature range of between 200° F. to 700° F. The results of the shrink down correlated in accordance with the specific expansion runs of Example IV are tabulated below and compared against a sleeve comprised of high density polyethylene material made in accordance with heretofore known methods.

strengths. Even at the elevated temperatures, the sleeve of the present invention exhibits a substantially higher "pull-down" force and at an appreciably faster rate of shrink down as compared to such heretofore known sleeves.

Thus, while we have illustrated herein a preferred embodiment of our invention, it is to be understood that changes and variations may be made by those skilled in the art without departing from the spirit and scope of the appended claims.

What is claimed is:

1. A method for continuously producing a heat-shrinkable tubing from a cross-linkable material including an admixture of polyethylene and a peroxide, said tubing exhibiting improved radial shrink-down characteristics when heated to a temperature at least equal to the crystalline melting point of said material comprising, extruding said material under heat into tubular form to a diameter less than that of an article to which it is to be applied and cooling said tubing, curing said tubing by extruding said tubing substantially vertically in the presence of an inert gaseous media at a temperature considerably above its crystalline melting point to give a predetermined cross-linking of the material sufficient to provide a desired predetermined elastic memory in the finished tubing, and the quench cooling said tubing, applying a substantially uniform coating of elastic adhesive material along the interior surface of said tubing, expanding said tubing by internal fluid pressure by creating a pressure differential between the inside and the outside of the tubing and substantially simultaneously heating said tubing without substantially interrupting the uniformity characteristics of said coating, and then cooling said expanded coated tubing sufficiently to set said tubing with a predetermined shrink-back radially from its fully expanded diameter.

2. A method of making adhesive coated, heat-shrinkable tubing from a cross-linkable thermoplastic material, said tubing exhibiting improved radial shrink-down characteristics in the range from 40 p.s.i. to 120 p.s.i. for adhesive bonding around a generally similarly shaped article when heated to a temperature at least equal to its crystalline melting point comprising, extruding about a mandrel a chemically cross-linkable crystalline polymeric thermoplastic material to a diameter less than that of the article to which it is to be applied, applying an external

| Temperature | Sleeve | Raw material tensile strength (p.s.i.) | Recovery time | Radial pull-down force (p.s.i.) | Radial pull-down force as percent of tensile strength | Expanded I.D. (inches) | Recovered I.D. (inches) |
|---|---|---|---|---|---|---|---|
| 200° F.–220° F. | Run 1 | 2,200 | 3 minutes | 100 | 4.6 | 2.90 | 2.00 |
| | Run 2 | 2,200 | do | 74 | 3.4 | 2.90 | 2.00 |
| | Run 3 | 2,200 | do | 100 | 4.6 | 3.00 | 2.00 |
| | Prior art | 3,500 | None by 15 minutes | None | None | 2.90 | None |
| 300° F.–320° F. | Run 1 | 2,200 | 2 minutes | 120 | 5.4 | 2.90 | 2.00 |
| | Run 2 | 2,200 | do | 100 | 4.6 | 2.90 | 2.00 |
| | Run 3 | 2,200 | do | 120 | 5.4 | 3.00 | 2.00 |
| | Prior art | 3,500 | None by 15 minutes | None | None | 2.90 | None |
| 380° F.–400° F. | Run 1 | 2,200 | 1.5 minutes | 120 | 5.4 | 2.90 | 2.00 |
| | Run 2 | 2,200 | do | 100 | 4.6 | 2.90 | 2.00 |
| | Run 3 | 2,200 | do | 120 | 5.4 | 3.00 | 2.00 |
| | Prior art | 3,500 | 7.0 minutes | 28 | 0.8 | 2.90 | 2.03 |
| 680° F.–700° F. | Run 1 | 2,200 | 20 seconds | 100 | 4.6 | 2.90 | 2.00 |
| | Run 2 | 2,200 | do | 80 | 3.6 | 2.90 | 2.00 |
| | Run 3 | 2,200 | do | 100 | 4.6 | 3.00 | 2.00 |
| | Prior art | 3,500 | 1 minute | 60 | 1.8 | 2.90 | 2.03 |

From the above tabulation, it can readily be seen that a shrink sleeve made in accordance with the present invention exhibits a marked and rapid "pull-down" force (e.g., 74 p.s.i. to 120 p.s.i.) at relatively low shrink down temperatures of from 200° F. to 320° F., particularly as compared to heretofore known type sleeves heated at the same temperature and even after prolonged time periods. Stated another way, it has been found that a shrink sleeve made in accordance with the invention even at these relatively low shrink down temperatures incorporates a "pull-down" force which is about 3.4% to 5.4% of the rated material tensile strength as compared to heretofore known type sleeves with initially higher rated tensile support in encompassing relation around said tubing, curing said tubing by heat at a temperature substantially above the crystalline melting point of said material to give cross-linking of the material in the range between about 30 percent to 90 percent to provide elastic memory in the finished tubing, removing said external support subsequent to said curing, applying a substantially uniform coating of flexible polymeric adhesive material along the internal surface of said tubing, expanding said tubing by internal fluid pressure to give a pressure differential between the inside and the outside of said tubing and substantially simultaneously heating said tubing without substantially interrupting the uniformity characteristics of said coating, and then cooling said expanded adhesive coated tubing to set said tubing so as to give said tubing elastic shrink-back characteristics and said shrink-down characteristics radially from its fully expanded diameter.

3. A method in accordance with claim 2, wherein said curing is carried out by heating said tubing with steam under pressure for a time sufficient to provide said cross-linking thereof.

4. A method in accordance with claim 2, wherein said expansion is carried out by applying a heated liquid under pressure to the internal surface of said tubing.

5. A method in accordance with claim 2, wherein said adhesive coating is made from an elastic resinous material which remains generally flexible at a temperature between about −40° F. to 180° F., and which is applied in a preheated condition to the internal surface of said tubing.

6. A method in accordance with claim 2, wherein said tubing is extruded onto a support member and then cooled to ambient temperature prior to said curing.

7. A method in accordance with claim 2, wherein said expansion is carried out at a pressure and time sufficient to provide shrink-back characteristics in the tubing of between about 8 percent to 12 percent radially from the fully expanded diameter of said tubing.

8. A method in accordance with claim 2, wherein said expansion is carried out at a temperature between about 150° F. to 175° F. at a pressure between about 25 p.s.i. to 60 p.s.i., and wherein the tubing is then cooled to ambient temperature.

9. A method in accordance with claim 2, wherein said material comprises an admixture of polyethylene and a peroxide.

10. A method in accordance with claim 2, wherein the step of applying said external support comprises wrapping a thin polymeric tape in helical relation around said tubing throughout its length thereof.

11. A method in accordance with claim 10 wherein the tape is of polyethylene terephthalate.

References Cited

UNITED STATES PATENTS

| | | | |
|---|---|---|---|
| 3,297,819 | 1/1967 | Wefmore | 264—230X |
| 3,303,243 | 2/1967 | Hughes et al. | 264—94X |

ROBERT F. WHITE, Primary Examiner

T. J. CARVIS, Assistant Examiner

U.S. Cl. X.R.

264—85, 99, 134, 230, 347; 285—45